United States Patent [19]
Ryoo

[11] Patent Number: 6,041,113
[45] Date of Patent: Mar. 21, 2000

[54] INTERFACE METHOD PERFORMED BY MODEM BETWEEN BASE STATION AND CONTROL STATION

[75] Inventor: Hyung-Taeg Ryoo, Kwacheon, Rep. of Korea

[73] Assignee: Samsung Electronics Co., Ltd, Rep. of Korea

[21] Appl. No.: 08/988,573

[22] Filed: Dec. 11, 1997

[30] Foreign Application Priority Data

Feb. 18, 1997 [KR] Rep. of Korea .......................... 97-4847

[51] Int. Cl.[7] .................................................. H04M 3/42
[52] U.S. Cl. ............................ 379/209; 379/46; 379/356
[58] Field of Search ..................... 379/209, 355, 379/356, 46, 354, 93.28, 93.32, 93.33, 93.34

[56] References Cited

U.S. PATENT DOCUMENTS

| | | | |
|---|---|---|---|
| 4,912,552 | 3/1990 | Allison, III et al. | 379/92.01 X |
| 4,933,968 | 6/1990 | Iggulden | 379/355 X |
| 5,359,651 | 10/1994 | Draganoff | 379/355 X |
| 5,479,500 | 12/1995 | Matsuzaki et al. | 379/355 |
| 5,528,681 | 6/1996 | Iwai et al. | 379/355 |
| 5,903,642 | 5/1999 | Schwartz et al. | 379/209 |

*Primary Examiner*—Creighton Smith
*Attorney, Agent, or Firm*—Dilworth & Barrese

[57] ABSTRACT

An interface method between a base station and a control station is provided. An embodiment of the present invention, recognizes the call interfacing state and includes the steps of detecting the generation of a call try state and checking whether or not a dial prevention state is generated. If the dial prevention state was generated, the state of the modem is checked. The call is retried depending on the state of the modem.

13 Claims, 6 Drawing Sheets

INTERFACE METHOD PERFORMED BY MODEM BETWEEN BASE STATION AND CONTROL STATION

BACKGROUND OF THE INVENTION

1. Field of the Invention

The present invention relates to an interface method performed by a modem between a base station and a control station and, more specifically, to a method for exchanging data by a multi-point interfacing data network using a modem.

2. Description of the Related Art

Generally, in a second generation cordless telecommunications network (CT-2), the interface method for interfacing a base station and a control station to control the base station is performed using either a private line or a dial-up modem.

In the case of using the private line in the interface method, a problem may occur in that the line load can be increased. In the conventional interface method using the modem, no method exists for controlling the delay resulting from numerous unsuccessful interface retry attempts. Further, since there is no limit to the number of call tries by the control station, the call is continuously retried until there is valid data transmission, even if the base station has suffered damage or a designated range of the storing data area has been exceeded. While the conventional interface method recognizes the on-line state of a user, it cannot control this recognition operation. Furthermore, if data, such as ID, stored at the base station is inadequate, a valid interface and data exchange can not be performed. Moreover, when the control station receives unstable data described above, the continuous retry attempts prevent the control station from interfacing with other base stations. Furthermore, in the case that a control station is controlling several base stations, limiting the number of modems in the control station may increase the fault call rate.

SUMMARY OF THE INVENTION

It is an object of the present invention to provide an interface method for interfacing a base station and a control station using a dial-up modem.

It is another object of the present invention to provide an interface method between the base station and the control station for controlling the call try of the base station.

It is further another object of the present invention to provide an interface method between the base station and the control station which recognizes the call interfacing state.

In order to achieve these and other objects, an interface method for interfacing a base station and a control station using a modem, is provided. An embodiment of the present invention includes the steps of detecting the generation of a call try state and checking whether or not a dial prevention state is generated. If the dial prevention state was generated, the state of the modem is checked. The call is retried depending on the state of the modem.

BRIEF DESCRIPTION OF THE DRAWINGS

A more complete appreciation of this invention, and many of the attendant advantages thereof, will be readily apparent as the same becomes better understood by reference to the following detailed description when considered in conjunction with the accompanying drawings, in which like reference symbols indicate the same or similar components, wherein.

DETAILED DESCRIPTION OF THE PREFERRED EMBODIMENT(S)

Figure 1:
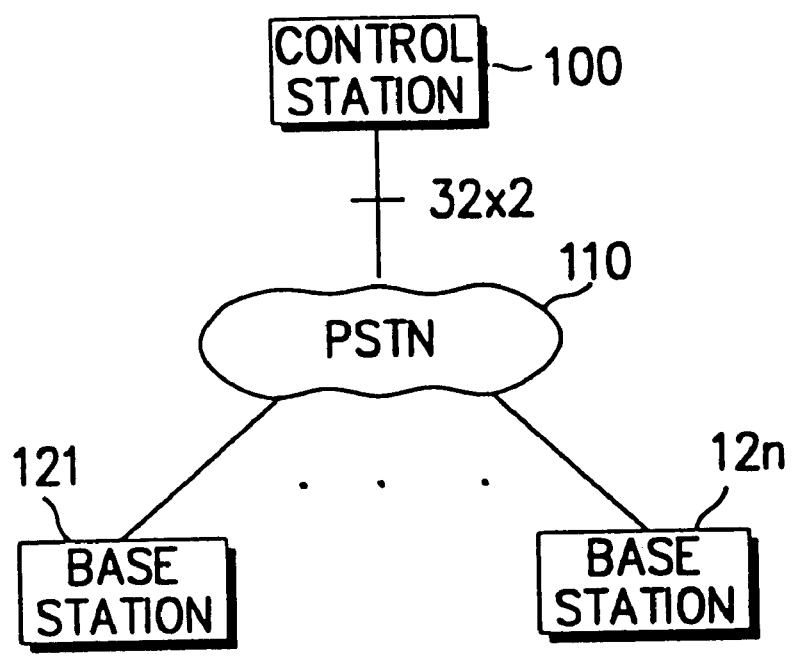
FIG. 1 shows the construction of the network of a base station using a modem where the present invention is applied.

FIG. 1 shows the construction of a telecommunications network composed of a control station 100, a public switched telephone network (PSTN) 110, and base stations 121~12n, according to the present invention.

Figure 2:
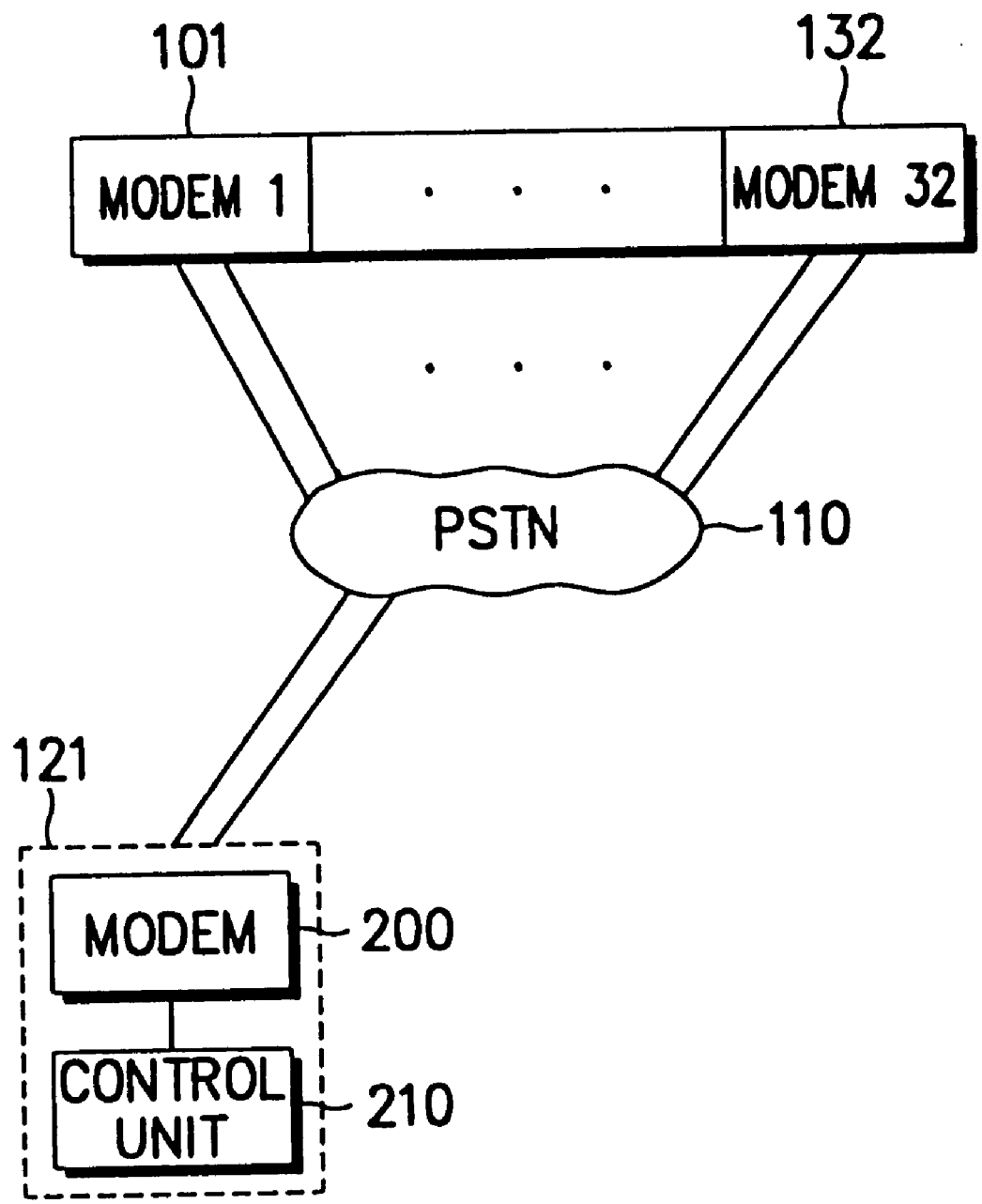
FIG. 2 shows the interface structure of a modem between a base station and a control station where the present invention is applied.

FIG. 2 shows the interface structure between a base station and a control station according to the present invention. The interface structure includes modems 101~132 of the control station, the PSTN 110, a modem 200 of the base station and a control unit 210 of the base station.

The present invention includes a storing variable for modem usage, an arbitrary time recording area for re-usage, and a call try fault recording variable. Also, control station 100 includes 32 modems and about 2000~3000 base stations, where the modems and the base stations can be multi-point interfaced with each other. A first layer between control station 100 and base stations 121~12n uses the PSTN and a second layer includes a modem of V.22bis and MNP class5. A portion of the second layer and a third layer include the protocol and the call try between control station 100 and base stations 121–12n performed upon generation of each state.

Figure 3:
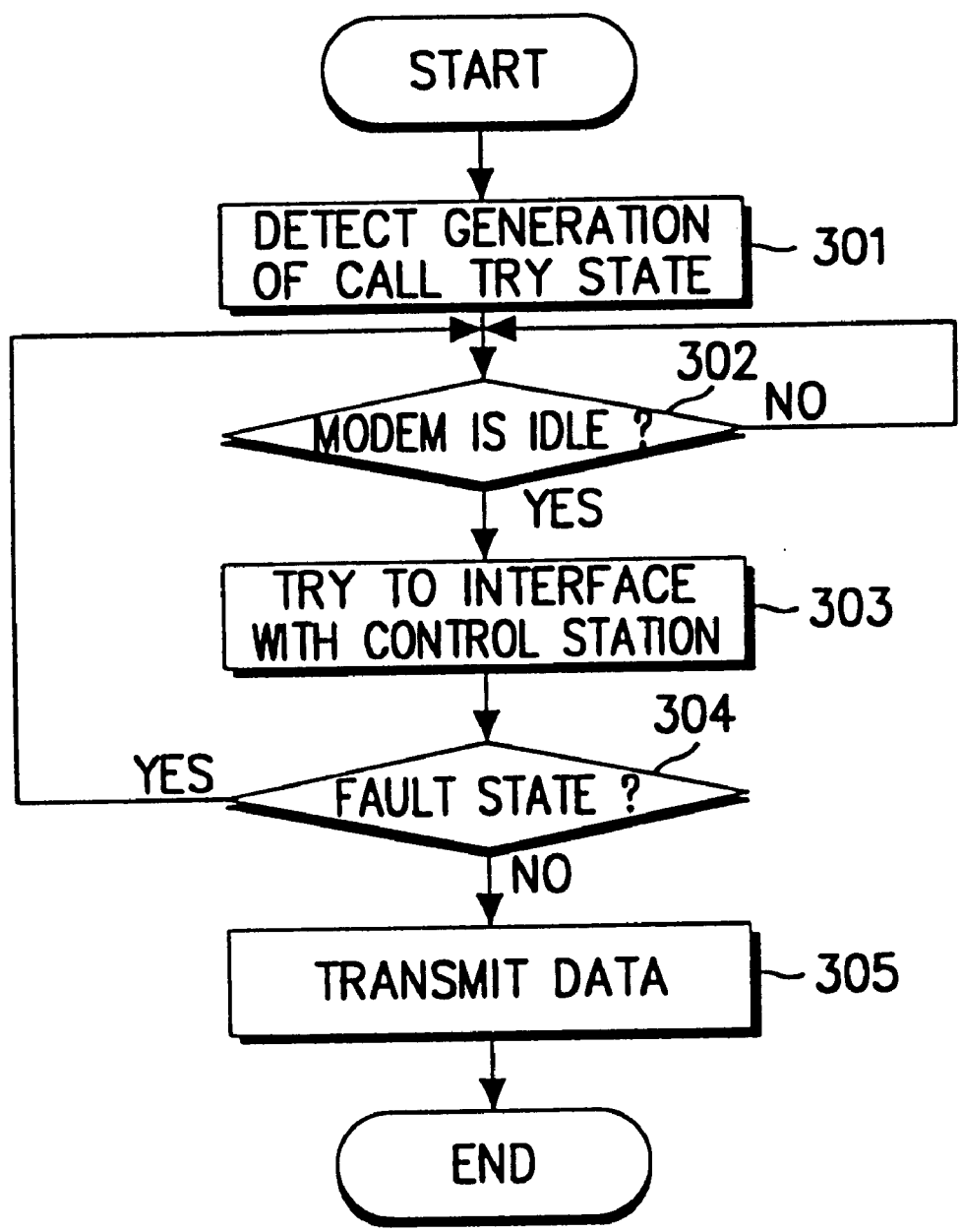
FIG. 3 is a flow chart illustrating a method for interfacing a base station and a control station according to an embodiment of the present invention.

FIG. 3 is a flow chart showing the interface method for interfacing a control station and a base station according to an embodiment of the present invention where the interface method is performed by recognizing the state of the modem during the call try. The embodiment is described by reference to FIGS. 1 to 3.

The control unit 210 detects the generation of call try state at step 301. Then, control unit 210 checks whether or not modem 200 is idle at step 302. If modem 200 is not idle, control unit 210 returns to step 302 and re-performs the corresponding operations. However, if modem 200 is idle, control unit 210 tries to interface with control station 100 at step 303.

Next, control unit 210 checks whether or not the interface try has generated a fault state at step 304. If a fault state has been generated, control unit 210 returns to step 302 and re-performs the corresponding operations. However, if a fault state has not been generated, control unit 210 transmits data at step 305, thereby completing overall operations of the call interface.

Figure 4:
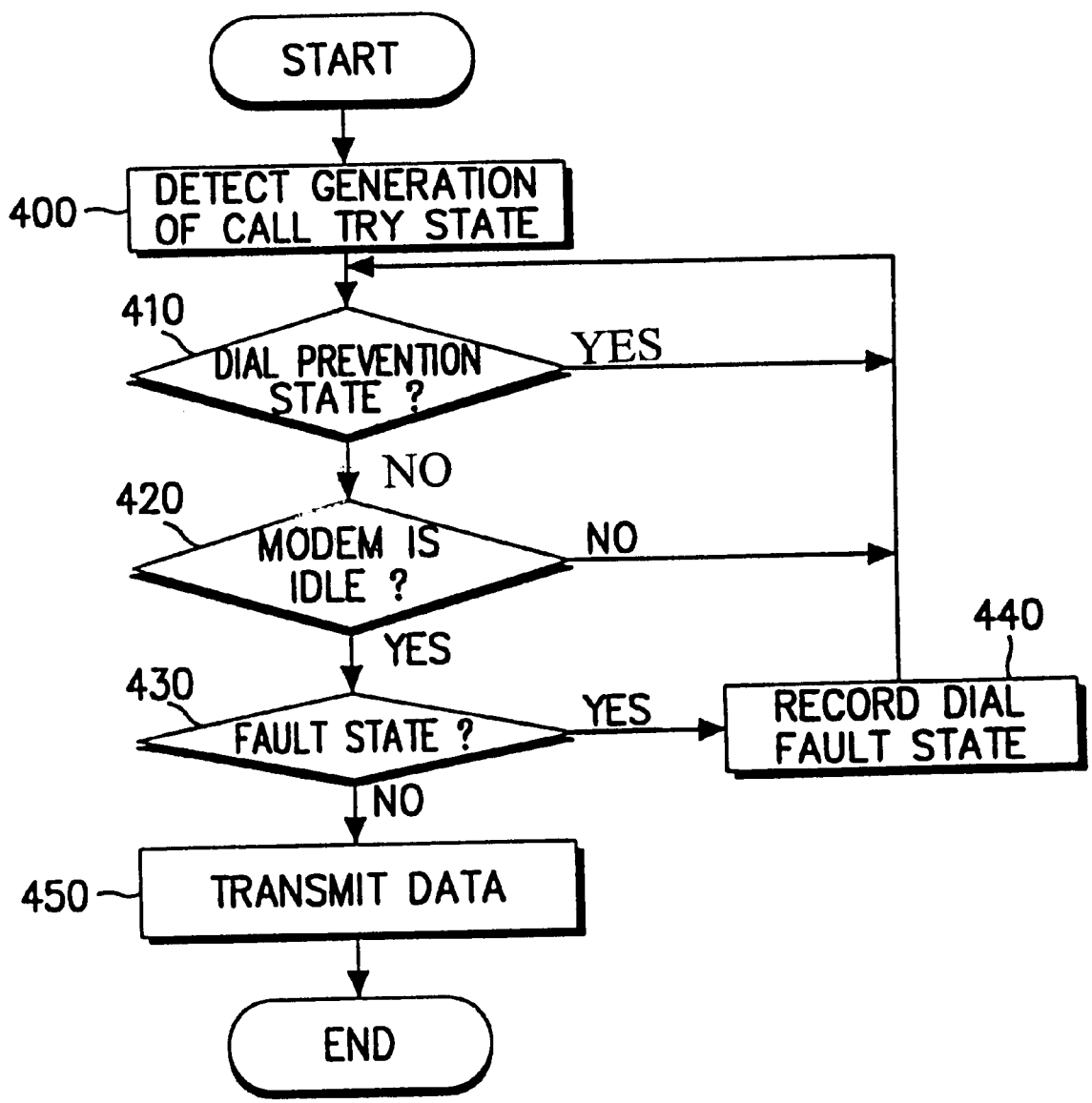
FIG. 4 is a flow chart illustrating a method for interfacing a base station and a control station according to an embodiment of the present invention.

FIG. 4 is a flow chart showing the interface method between the base station and the control station according to an embodiment of the present invention where the interface method includes checking conditions such as, for example, a dial prevention state. The embodiment is described by reference to FIGS. 1 to 4.

When attempting an interface between base stations 121~12n and control station 100, operation states corresponding to the retry dial number and the retry dial time are checked when the modem is busy (i.e., not idle), when the interface is faulted by other states, or the dial fault state is generated.

The control unit 220 detects the generation of the call try state at step 400. Then, control unit 220 checks whether or not the dial prevention state is generated at step 410. If the dial prevention state was not generated, control unit 220 proceeds to step 440 to record the dial fault state.

However, if the dial prevention state was generated, control unit 220 checks whether or not modem 210 is idle at step 420. If modem 210 is not idle, control unit 220 proceeds to step 440 to record the dial fault state. In contrast, if modem 210 is idle, control unit 220 checks whether or not the fault state is generated at step 430. If the fault state has been generated, control unit 220 proceeds to step 440 to record the dial fault state. However, if the fault state has not been generated, control unit 220 performs a normal transmission of data at step 450.

Figure 5:
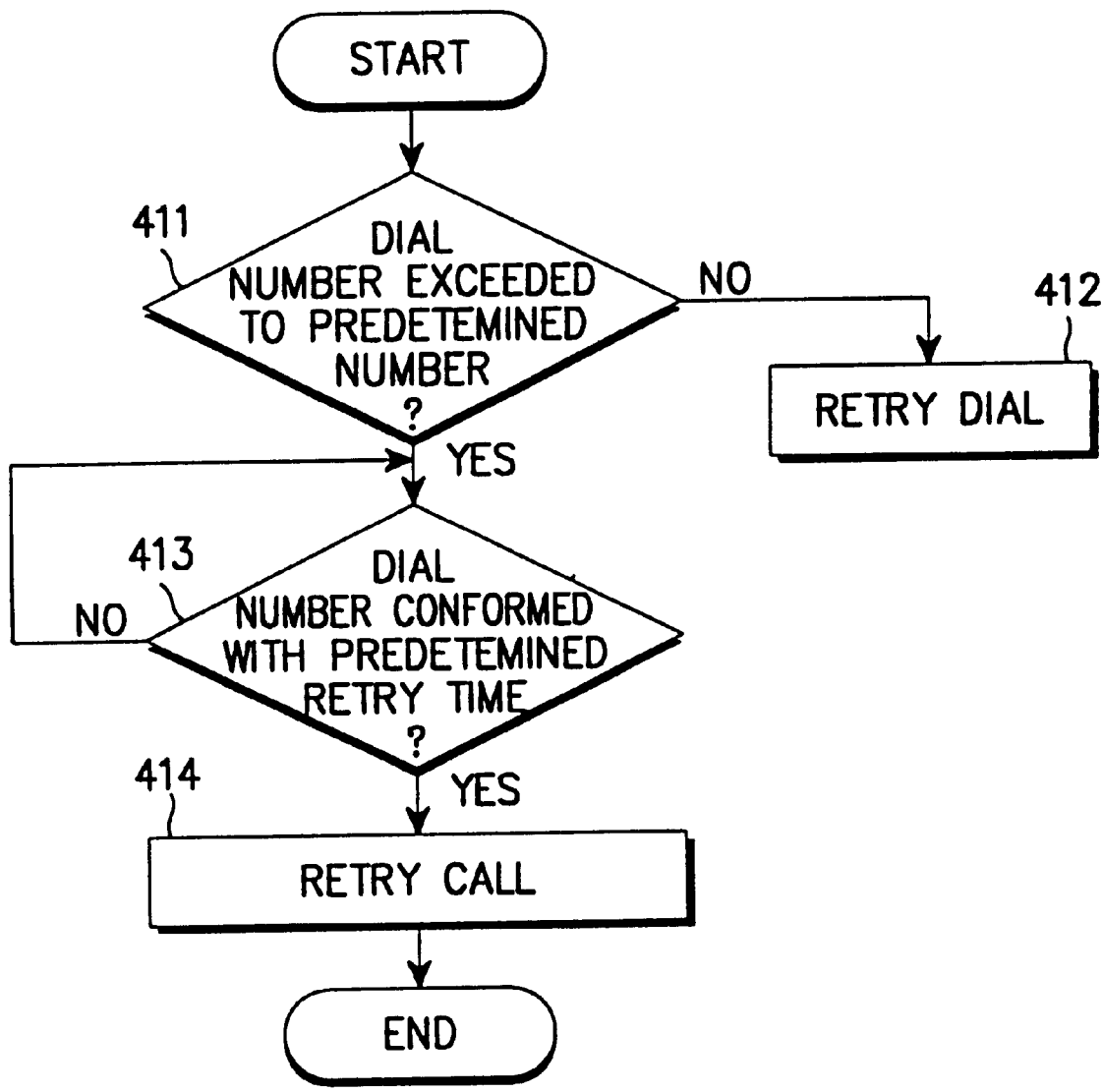
FIG. 5 is a flow chart illustrating the interface retry method for interfacing a base station and a control station according to an embodiment of the present invention.

FIG. 5 is a flow chart showing the interface retry method for interfacing a control station and a base station using a modem according to an embodiment of the present invention where interface retry includes checking the dial number. The embodiment is described by reference to FIGS. 2 to 5.

The control unit 220 checks at step 411 whether or not the tried dial number has been tried more than a predetermined number of times, preferably three times. If the dial number has not been tried more than the predetermined number of times, then control unit 220 retries the dial (i.e., redials the dial number) at step 412. If the dial number has been tried more than the predetermined number of times, then control unit 220 checks whether or not the time required for the dial attempts conforms with a predetermined retry time at step 413. If the time required for the dial attempts conforms with the predetermined retry time, control unit 220 retries the call (which can include redialing the dial number) at step 414. In contrast, if the required time for the dial attempts does not conform with the predetermined retry time, control unit 220 returns to step 413 and re-performs the corresponding operations.

Figure 6:
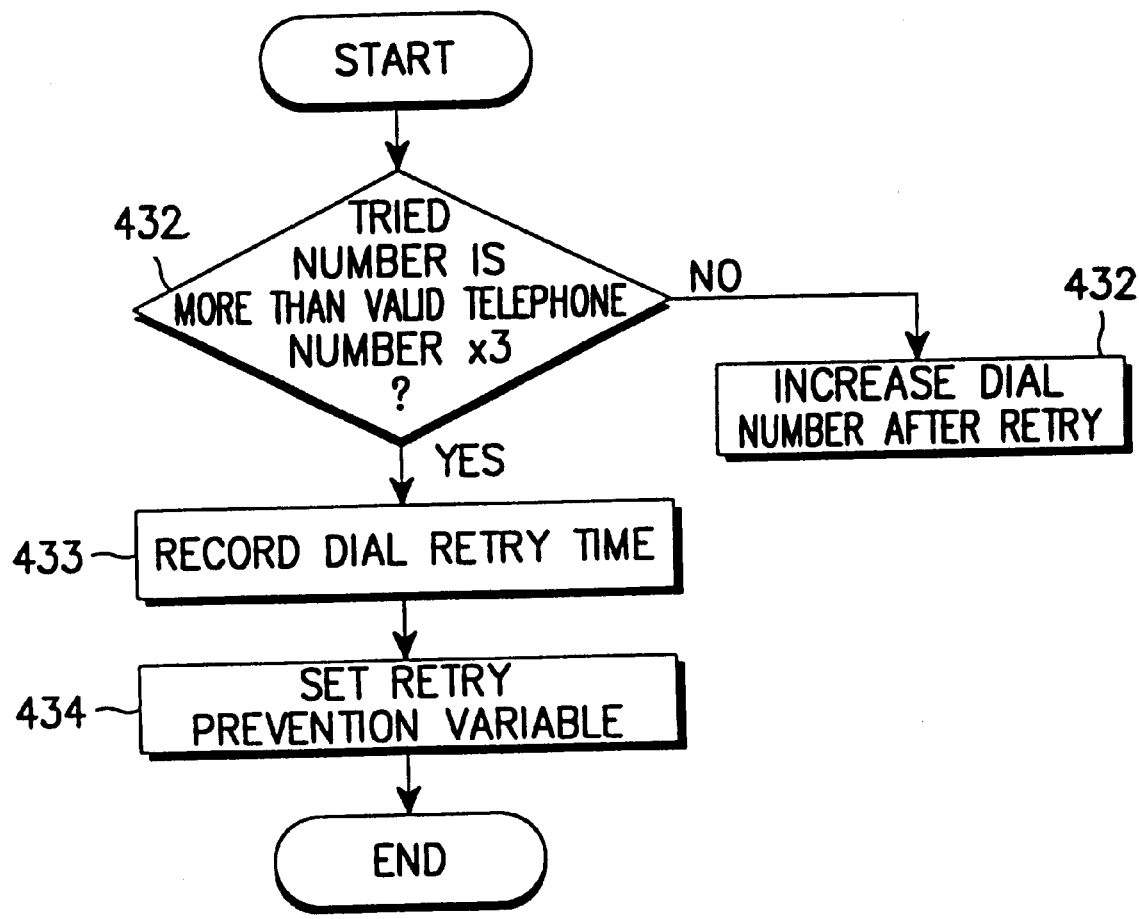
FIG. 6 is a flow chart illustrating the dial retry method between a base station and a control station according to an embodiment of the present invention.

FIG. 6 is a flow chart showing the dial retry method between a control station and a base station using a modem according to an embodiment of the present invention where the retry relies upon the dial number. It is to be appreciated that the interface retry method of FIG. 5 can include the dial retry method of FIG. 6. The embodiment is described by reference to FIGS. 2 to 6.

At step 431, control unit 220 checks a predetermined number of times, preferably three times, if the tried dial number is among a plurality of telephone numbers stored at the base station to ensure that the dial number is valid. If the tried dial number is not stored in the base station, increase the counter keeping track of how many redials were made at step 432. However, if the tried dial number is stored in the base station, record the dial retry time at step 433. Then set the retry prevention variable at step 434.

If the call interface is successfully performed by the control station and the necessary operation is completed, a link release message is transmitted to escape the continuous retry state present in conventional interface methods.

As apparent from the foregoing, the present invention can reduce the occupation rate of the public switched telephone network (PSTN) due to excessive call interface retries. Additionally, in the case of a defective base station, numerous unnecessary retry attempts are prevented. Furthermore, in the case of multi-point interfacing a plurality of base stations and the control station, the present invention can simultaneously prevent unnecessary call requests.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An interface method performed by a modem between a base station and a control station, comprising the steps of:

(a) detecting the generation of call try;

(b) checking whether or not a dial prevention state is generated;

(c) checking a state of the modem when the dial prevention state was generated; and (d) retrying the call in response to the state of the modem.

2. The method of claim 1, wherein said step of checking the modem state further comprises the step of determining if a tried dial number is among a plurality of telephone numbers; and step (d) is performed depending on the result of the determining step.

3. The method of claim 2, wherein the plurality of telephone numbers are stored at the base station.

4. The method of claim 2, wherein step (d) is performed if it is determined that the tried telephone number is among the plurality of telephone numbers.

5. The method of claim 2, wherein said determining step is performed up to three times.

6. The method of claim 2, wherein determining step (d) is performed up to three times.

7. The method of claim 5, wherein a link release message is transmitted when a proper interface resulting in transmitted data has occurred between the base station and the control station.

8. The method of claim 5, wherein a link release message is transmitted if step (d) has been performed three times.

9. An interface method performed by a modem between a base station and a control station, comprising the steps of:

(a) detecting the generation of a call try state;

(b) checking if a dial prevention state is generated;

(c) recording a dial fault state when the dial prevention state is not generated;

(d) checking if the modem is idle when the dial prevention state is generated;

(e) recording a dial fault state when the modem is not idle;

(f) checking if a fault state is generated when the modem is idle;

(g) recording the dial fault state when the fault state has been generated; and (h) transmitting data when the fault state has not been generated.

10. An interface method performed by a modem between a base station and a control station, comprising the steps of:

(a) determining whether a tried dial number has been tried more than a predetermined number of times;

(b) retrying the dial when the dial number has not been tried more than the predetermined number of times;

(c) determining whether the time required for dial attempts conforms with a predetermined retry time when the dial number has been tried more than the predetermined number of times;

(d) retrying the call when the time required for dial attempts conforms with the predetermined retry time; and (e) returning to step (c) when the required time for dial attempts does not conform with the predetermined retry time.

11. The method of claim 10, wherein the predetermined number of times is three.

12. A dial retry method performed by a modem between a base station and a control station, comprising the steps of:

(a) determining whether a tried dial number is among a plurality of telephone numbers stored at the base station, said step of determining being performed a predetermined number of times;

(b) increasing a redial counter when the tried dial number is not stored in the base station;

(c) recording a dial retry time when the tried dial number is stored in the base station; and (d) setting a retry prevention variable.

13. The method of claim 12, wherein the predetermined number of times is three.

* * * * *